Patented Jan. 7, 1941

2,228,051

UNITED STATES PATENT OFFICE 2,228,051

COMPOUND OF HYDROXYQUINOLINE-SULPHONIC ACIDS AND THE PRODUCTION THEREOF

Fritz Feigl, Vienna, Germany, assignor to Interpublic A.-G., Zurich, Switzerland, a corporation of Switzerland No Drawing. Application April 27, 1938, Serial No. 204,562. In Austria April 28, 1937

4 Claims. (Cl. 260—270)

This invention relates to the production of valuable water-soluble compounds of 8-hydroxyquinoline-sulphonic acids having in particular useful therapeutic and/or disinfectant properties.

The new method according to the invention consists in reacting 8-hydroxyquinoline-monosulphonic acids or 8-hydroxyquinoline-di-sulphonic acid, their salts, derivatives or substitution products with aluminium or aluminium compounds, preferably the oxide, hydroxide, carbonate, or basic salts thereof, or in reacting 8-hydroxyquinoline-sulphonic acid-5 or 8-hydroxyquinoline-disulphonic acid, the salts and derivatives thereof with zinc or zinc compounds, preferably the oxide, hydroxide, carbonate, or basic salts, in the presence of a solvent for at least one of the reaction components, preferably water or aqueous liquid. The sulphonic acid component may be reacted in the form of free sulphonic acid, or as a soluble salt such as alkali salt, for instance, when 8-hydroxyquinoline-disulphonic acid is used, as acid alkali salt, with one of the said metal compounds. As substituted 8-hydroxyquinoline-sulphonic acids there may suitably be used for example the halide substitution products thereof, such as bromine or iodine substituted 8-hydroxyquinoline-sulphonic acid or its salts.

In accordance with the invention, when the said 8-hydroxyquinoline-sulphonic acids or their salts and/or derivatives or substitution products are reacted with the said metal compounds, there are obtained readily water-soluble novel compounds having good disinfecting and also therapeutic properties. In these new compounds it is probable that the introduced heavy metal is chemically combined intracomplexly. The aqueous solutions do not show or only show partially the ionic reactions of the metal used. Owing to their antiseptic and astringent properties, the new compounds are suitable for example for use as a medium for the treatment of the skin after shaving. The method according to the invention will now be described in greater detail with the aid of some examples of the mode in which the method is actually put into practice.

Examples (1) Into a boiling concentrated aqueous solution of the mono sodium salt of 8-hydroxyquinoline-sulphonic acid there is introduced, in small quantities at a time, freshly precipitated and washed aluminium hydroxide until the introduced aluminium hydroxide is no longer dissolved on stirring. After the addition of a small excess of aluminium hydroxide the reaction mixture is further heated for about an hour to boiling temperature and then filtered, after which the filtrate is evaporated down to dryness on a water bath. In this manner there is obtained the aluminium compound, this being a yellowish and glassy mass. The salt is very readily soluble in water and may be precipitated from the aqueous solution with the aid of alcohol. The aluminium content amounts to about 6–7%. An approximately 4% aqueous solution of this compound has excellent disinfectant action. The compound is non-poisonous and may also be administered per os in considerable quantities without doing any harm.

(2) Into an approximately 10% hot aqueous solution of 8-hydroxyquinoline-disulphonic acid there is introduced aluminium hydroxide as long as the same becomes dissolved. The solution is then boiled for some minutes and filtered to remove the undissolved aluminium hydroxide, and then evaporated to dryness on a water bath. The resulting aluminium salt represents a yellow powder which is readily soluble in water, and which contains approximately 6.5% of aluminium.

(3) Into a boiling aqueous solution of the mono sodium salt of 8-hydroxyquinoline-sulphonic acid there is introduced pure zinc oxide or basic zinc carbonate as long as dissolving of the zinc oxide still takes place and a slight excess then added. After heating, the solution is filtered and the filtrate evaporated to dryness on a water bath. The residue is a zinc-containing salt which is readily soluble in water, has a zinc content of approximately 15%, and in addition contains ionizable sodium.

(4) To a boiling aqueous solution of free 8-hydroxyquinoline-disulphonic acid there is added an excess of pulverized zinc oxide, and the resulting solution filtered and evaporated. The dry residue is taken up in a small quantity of water, separated from undissolved components (mainly zinc oxide) by filtration, and the clear solution evaporated. The residue is a zinc salt soluble in water giving a clear solution, is almost colorless, and contains approximately 22% of zinc.

(5) To a hot aqueous solution of the sodium salt of 8-hydroxyquinoline-sulphonic-acid-5 there is added aluminium hydroxide as long as this latter becomes dissolved. The excess thereof is filtered off after the heating of the reaction mixture, and the filtrate evaporated on a water bath. The residue is a pale yellow aluminium salt which is readily soluble in water and which has an Al content of approximately 6%.

In an analogous manner it is possible to produce for example an aluminium salt of 7-iodine-8-hydroxyquinoline-sulphonic-acid-5 with 2.2% of aluminium, as a compound readily soluble in water.

(6) Free 8-hydroxyquinoline-sulphonic-acid-5 is suspended in five times its quantity of water, and triethanol amine added up to solution in the heat. Zinc oxide is then added in such quantity that an excess thereof remains undissolved, after which the solution is boiled for some minutes, filtered, and evaporated on a water bath. The syrupy mass is finally dried in a desiccator over concentrated sulphuric acid. The zinc salt thus obtained represents a yellow and extremely hygroscopic powder which contains approximately 7.5% of zinc.

(7) To a hot aqueous solution of the sodium salt of 8-hydroxyquinoline-sulphonic-acid-7 there is added as much aluminium hydroxide as will dissolve. The excess is filtered off after heating of the reaction mixture, and the filtrate evaporated on a water bath, leaving a yellow readily water-soluble aluminium salt containing 5% of Al.

I claim:

1. The method of producing water-soluble, complex heavy metal compounds of 8-oxyquinoline-sulphonic acids consisting in adding a substance selected from the group consisting of zinc oxide and aluminum oxide to a substance selected from the group consisting of 8-oxyquinoline-sulphonic acid, 8-oxyquinoline-disulphonic acid, 7-iodine-8-oxyquinoline-monosulphonic acid-5, their alkali metal and their triethanol amine salts at an elevated temperature as long as solution of the substances of the first named group takes place, thereupon adding an excess of the reacting substances from said first named group, boiling the solution for a comparatively short time, separating the solution from the undissolved substances and obtaining in the resulting solution the 8-oxyquinoline-sulphonic acid compound in the complex water-soluble form.

2. A water-soluble complex compound consisting of at least one metal selected from the group consisting of zinc and aluminum and of at least one substance selected from the group consisting of 8-oxyquinoline-sulphonic acid, 7-iodine-8-oxyquinoline-monosulphonic acid-5, 8-hydroxyquinoline-disulphonic acid, their alkali metal salts and their triethanol amine salts.

3. A product according to claim 2 in the form of a mono-alkali metal salt of an 8-hydroxy-mono-sulphonic acid of which the zinc contents approximately amounts to 14 to 16%.

4. A product according to claim 2 in the form of a mono-alkali metal salt of an 8-hydroxy-mono-sulphonic acid of which the zinc contents approximately amounts to 7 to 8%.

FRITZ FEIGL.